(12) United States Patent
Magagnini

(10) Patent No.: US 9,110,460 B2
(45) Date of Patent: Aug. 18, 2015

(54) MANAGEMENT SYSTEM FOR OPERATION ITEMS USED IN MANUFACTURING

(75) Inventor: Marco Magagnini, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 340 days.

(21) Appl. No.: 12/328,100

(22) Filed: Dec. 4, 2008

(65) Prior Publication Data

US 2009/0149967 A1   Jun. 11, 2009

(30) Foreign Application Priority Data

Dec. 4, 2007   (EP) .................................... 07023417

(51) Int. Cl.
*G05B 11/01* (2006.01)
*G05B 19/418* (2006.01)

(52) U.S. Cl.
CPC .................................... *G05B 19/418* (2013.01)

(58) Field of Classification Search
CPC ................. G05B 19/02; G05B 19/418; G05B 2219/31166; G05B 2219/31323; G05B 2219/32015
USPC ............. 700/17, 86, 95, 96, 97, 99, 100, 108, 700/109, 110, 174, 175; 703/7; 707/999.102; 715/771; 705/8, 9
See application file for complete search history.

(56) References Cited

U.S. PATENT DOCUMENTS

| | | | | |
|---|---|---|---|---|
| 5,216,612 A * | 6/1993 | Cornett et al. | .................. | 700/96 |
| 5,396,432 A * | 3/1995 | Saka et al. | .................... | 700/111 |
| 5,777,876 A * | 7/1998 | Beauchesne | ..................... | 700/95 |
| 6,275,740 B1 * | 8/2001 | Smith et al. | .................... | 700/108 |
| 6,311,093 B1 * | 10/2001 | Brown | .......................... | 702/184 |
| 6,546,300 B1 * | 4/2003 | Fukuda et al. | ................. | 700/100 |
| 6,618,692 B2 * | 9/2003 | Takahashi et al. | ............ | 702/188 |
| 6,671,570 B2 * | 12/2003 | Schulze | .......................... | 700/99 |
| 6,711,456 B2 * | 3/2004 | Yokomori et al. | .............. | 700/96 |
| 6,801,826 B2 * | 10/2004 | Tanabe | .......................... | 700/121 |
| 6,876,894 B1 * | 4/2005 | Chen et al. | .................... | 700/100 |
| 7,027,943 B2 * | 4/2006 | Steinkirchner et al. | ........ | 700/110 |
| 7,062,344 B2 * | 6/2006 | Yokoyama et al. | ........... | 700/112 |
| 7,133,733 B2 * | 11/2006 | Okada et al. | .................... | 700/97 |
| 7,142,936 B2 * | 11/2006 | Yokomori et al. | .............. | 700/97 |
| 7,209,846 B2 * | 4/2007 | Tamaki et al. | ................... | 702/84 |
| 7,321,805 B2 * | 1/2008 | Yamada et al. | ............... | 700/121 |
| 7,496,890 B2 * | 2/2009 | Miller et al. | ................... | 717/107 |
| 7,565,215 B2 * | 7/2009 | Kolenc et al. | .................... | 700/97 |
| 7,684,887 B2 * | 3/2010 | Behrisch et al. | .............. | 700/110 |

(Continued)

*Primary Examiner* — Charles Kasenge
(74) *Attorney, Agent, or Firm* — Laurence A. Greenberg; Werner H. Stemer; Ralph E. Locher

(57) ABSTRACT

A management system for operation items used in manufacturing on a production line includes a module on which one of several production based operation items is storable as a header of a group list in relation to a manufacturing subsystem. For each production based operation item, at least one non-production based operation item is storable as a content of the corresponding group list, so that a hierarchical subdivision of production/non-production operation items in a plurality of group lists is provided in order to input them on a processing unit in a standard form. Since a hierarchical subdivision of production/non-production operation items in a plurality of group lists is permanently provided for each subsystem and their processes to be managed, a very simple and uniform/universal structure for management of all items can be advantageously obtained in a central way at the processing unit.

9 Claims, 1 Drawing Sheet

(56) References Cited

U.S. PATENT DOCUMENTS

| | | | |
|---|---|---|---|
| 7,797,062 B2* | 9/2010 | Discenzo et al. | 700/28 |
| 7,899,562 B2* | 3/2011 | Pannese et al. | 700/48 |
| 8,134,743 B2* | 3/2012 | Rai | 705/7.12 |
| 8,145,517 B2* | 3/2012 | Rai | 705/7.12 |
| 8,595,041 B2* | 11/2013 | Schmidt | 705/7.11 |
| 2002/0035447 A1* | 3/2002 | Takahashi et al. | 702/188 |
| 2002/0116083 A1* | 8/2002 | Schulze | 700/108 |
| 2002/0123818 A1* | 9/2002 | Yamada et al. | 700/121 |
| 2003/0014139 A1* | 1/2003 | Yokomori et al. | 700/96 |
| 2003/0139936 A1* | 7/2003 | Saucier et al. | 705/1 |
| 2004/0107020 A1* | 6/2004 | Yokoyama et al. | 700/121 |
| 2004/0176870 A1* | 9/2004 | Yokomori et al. | 700/169 |
| 2006/0009943 A1* | 1/2006 | Keck et al. | 702/122 |
| 2006/0010416 A1* | 1/2006 | Keck et al. | 716/19 |
| 2006/0047454 A1* | 3/2006 | Tamaki et al. | 702/84 |
| 2006/0100728 A1* | 5/2006 | Brown | 700/97 |
| 2007/0156271 A1* | 7/2007 | Runde et al. | 700/96 |
| 2007/0185754 A1* | 8/2007 | Schmidt | 705/9 |

* cited by examiner

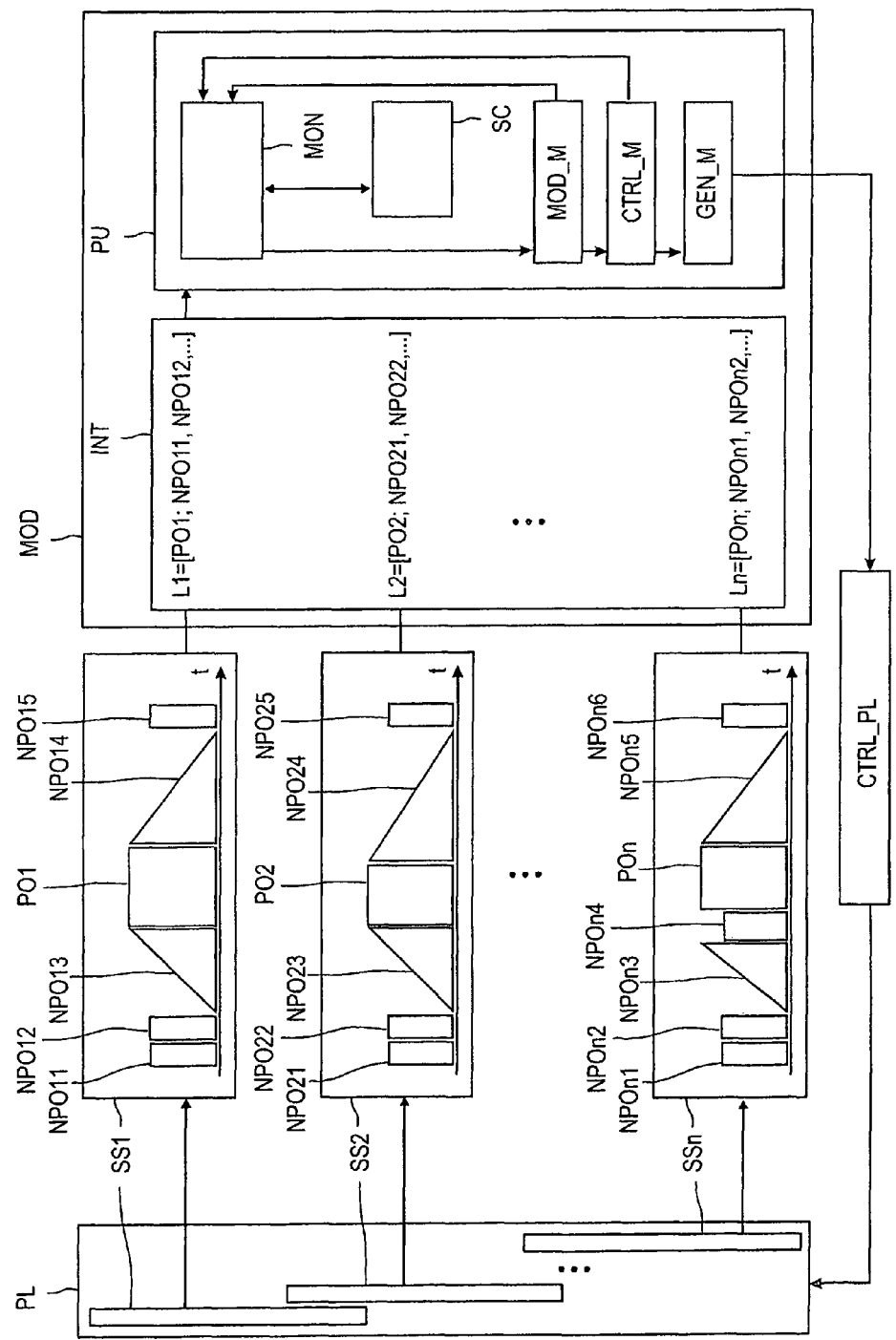

MANAGEMENT SYSTEM FOR OPERATION ITEMS USED IN MANUFACTURING

CROSS-REFERENCE TO RELATED APPLICATION

This application claims the priority, under 35 U.S.C. §119, of European Patent Application EP 07 023 417.4, filed Dec. 4, 2007; the prior application is herewith incorporated by reference in its entirety.

BACKGROUND OF THE INVENTION

Field of the Invention

The present invention relates to a management system for operation items used in manufacturing.

Today there is a need for enhancing the management of operation items used in manufacturing, such as for example on a production line wherein production machines and associated processes of subsystems have to be managed in order to reach optimal manufacturing expectations.

The operation items are multiple for a subsystem on a production line. Mainly, it is possible to differentiate production based operation items from non production based operation items. For example, a production based operation item can be manufacturing of a piece of a product at a stage of the production line as opposed to a non production based operation item which can be providing maintenance of a stage of the production line without any physical intervention on the product per se.

In the case of the management of a plurality of operation items including both the production and non-production items in order to model or simulate, to test and to validate the entire processing for associated subsystems on a production line, it is easy to understand that dependencies between operation items have to be checked in a very highly complex way before a manufacturing process can be definitively approved and implemented.

SUMMARY OF THE INVENTION

It is accordingly an object of the invention to provide a simple management system for manufacturing production and non-production operation items, which overcomes the hereinafore-mentioned disadvantages of the heretofore-known systems of this general type.

With the foregoing and other objects in view there is provided, in accordance with the invention, a management system for operation items used in manufacturing on a production line. The management system comprises a processing unit and a module configured for storing one of a plurality of production based operation items as a header of a group list in relation to a manufacturing sub-system. At least one non-production based operation item can be stored for each production based operation item as a content of a corresponding group list, for providing a hierarchical subdivision of production/non-production operation items in a plurality of group lists to input them on the processing unit in a standard form.

Since a hierarchical subdivision of production/non-production operation items in a plurality of group lists is permanently provided for each subsystem and their processes to be managed, a very simple and uniform/universal structure for management of all items can be advantageously obtained in a central way at the processing unit.

In accordance with another feature of the invention, in a preferred embodiment, it is possible to make the management system interactive through the use of an interface with an operator or a central management system that can simply and centrally follow the foreseen hierarchy in order to define a single management profile optimally combining all kinds of items according to predefined manufacturing expectations.

In accordance with a concomitant feature of the invention, the preferred management system can be used for a plurality of profitable applications such as:

performing a simulation of management of operation items used in manufacturing on the production line;

checking at least one non-constant occurrence of management of operation items used in manufacturing on the production line; and generating release software for a management unit of operation items used in manufacturing on the production line.

Other features which are considered as characteristic for the invention are set forth in the appended claims.

Although the invention is illustrated and described herein as embodied in a management system for operation items used in manufacturing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE VIEW OF THE DRAWING

The FIGURE of the drawing is a modular view of a management system for operation items used in manufacturing on a production line.

DETAILED DESCRIPTION OF THE INVENTION

Referring now in detail to the single FIGURE of the drawing, there is seen a modular view of a management system for operation items used in manufacturing on a production line PL which includes several subsystems SS1, SS2, . . . , SSn (n>1) that can be in the form of sequentially placed machinery units necessary for a manufacturing process.

Mainly, the management system includes the following modules:

a module MOD on which one of the production based operation items PO1, PO2, . . . is storable as a header of a group list L1, L2, . . . , Ln in relation to one of the manufacturing sub-systems SS1, SS2, . . . , for each production based operation item, at least one non-production based operation item NPO11, NPO12, . . . ; NPO21, NP022, . . . ; . . . ; NPOn1, NPOn2, . . . is storable as contents of the corresponding group list, so that a hierarchical subdivision of production/non-production operation items is provided uniformly in a plurality of group lists in order to input them on a processing unit PU in a standard/uniform form.

The module MOD can provide an output signal that is input in a control or management unit CTRL_PL that is connected to command interfaces of the subsystems SS, SS2, . . . , SSn. The command interfaces execute processes according to the operation items that have been managed and validated over the module MOD and its processing unit PU.

In the present example, three different time sub-repartitions NPO11, NPO12, NPO13, PO1, NOP14, NPO15; NPO21, MPO22, NPO23, PO2, NPO24, NPO25; NPOn1, NPOn2, NPOn3, MPOn4, POn, NPOn5, NPOn6 of production and non production operation items are represented for three corresponding subsystems SS1, SS2, SSn. Non production operation based items can, for example, be machine setups, machine cleaning, product quality checks, etc. An execution of these operations can, however, be strictly bounded to a primary production operation based item in term of productivity or quality of the manufacturing. Through the use of the generated group lists L1, L2, L3 wherein a hierarchical sequence of operation items is provided, it is advantageously possible to standardize the kind of all operation items as well as to attribute links between them.

Although the three different time sub-repartitions are represented separately, they can overlap partially or completely in term of time. The management system according to the invention enables the organization of all operation items under a preferred time or/and quality schedule through the use of group lists.

In a sample production segment, a typical example of chronological phases for modeling a group list can be represented as follows:
- NPO11 designates a setup of the subsystem SS1 before a filing/loading of a sample in the subsystem;
- NPO12 designates a material preparation phase for the sample;
- NPO13 designates the filing/loading of the sample in the subsystem SS;
- PO1 designates, in this case, the only production based operation item (as a header of a group list) in the form of executing a production process at the subsystem SS1;
- NPO14 designates an unloading phase of the sample out of the subsystem SS; and
- NPO15 designates a cleaning phase of the subsystem SS1 after the unloading phase.

The operation items can also be customizable or actualizable if a new process has to be implemented, for example by exchanging or inserting a new manufacturing unit on a subsystem. For this purpose, the group lists present the advantage to be clearly actualizable over an interface and to be easy to be re-input and newly interpreted in the central module MOD and its processing unit PU. This is the reason why the module MOD can advantageously include a program based interface INT for selectively actualizing the group lists. The interface INT can be a parallel input of the module MOD that transmits all kinds of operation items from each system management of subsystems SS1, SS2, . . . , SSn to the processing unit PU in a group list form. That means that the interface is able to perform the hierarchical sequencing between production and non-production operation items. This can be manually done over an interaction of an operator on the group list before the inputting of group list in the processing unit PU. This can also be done automatically by an additional information signal output from each subsystem. This information signal isolates one of all of the production operation items and associates hierarchically all depending non production operation items in a corresponding group list. A combination of manual and automatic generation/actualization of the group lists is also possible if a module of the production line requires it. A further sub-hierarchy between group lists can be provided in the same way.

In the case of a manual check of the group lists, the interface INT is coupled to an interactive monitoring MON and selecting device SC for adding, deleting and activating all production and non-production operation items at the request of the operator. The interactive monitoring MON and selecting device SC can also be connected to or be part of the processing unit PU in order to control, adapt and command manufacturing processes that are required at the production line.

The processing unit PU can provide further advantageous aspects for simplifying the management of grouped operation items:

The processing unit can include a modeling device MOD_M for performing a simulation of management of operation items used in manufacturing on the production line. The modeling device MOD-M is, for example, a module in connection with the monitoring device MON in order to monitor a customizable modeling of management after its modeling over an operator or/and over a preferred automatic optimization based on time, quality or other production related criteria.

The processing unit can include a control device CTRL_M for checking at least one non-constant occurrence of management of operation items used in manufacturing on the production line. Ideally the controlling device is a module in connection with the aforementioned modeling device MOD_M (and the monitoring device MON) in order to detect and exhibit defects of a modeling being performed.

The processing unit can include a device GEN_M for generating a validated main command process through the use of command signals or/and release software for the management unit CTRL_PL of operation items used in manufacturing on the production line PL. Ideally, the device GEN_M for generating release software is a module in connection with the control device CTRL_M, so that after a successful check of a modeled management (and a possible monitoring of it), the device GEN_M outputs a command signal into the management unit CTRL_PL.

The release software for the management of a manufacturing operation item on the production line is embeddable in main software for managing other similar release software related to possible further production lines.

All modules and devices presented and described according to the invention can be realized over hardware devices as well as parts of software that are stored on a server which controls processes of subsystems of a production line. The server is then connected to a monitoring device such as a touch screen in order to allow an operator to visually control the processes of management according to the invention as well as to modify them at his or her convenience.

The invention claimed is:

1. A management system for operation items used in manufacturing on a production line, the management system comprising:
   a processing unit;
   a module configured for storing a plurality of group lists, each one of the plurality of group lists including a header formed by a respective one of a plurality of production based operation items being production processes to be executed in a manufacturing sub-system, said module configured for storing a plurality of non-production based operation items for each of the plurality of production based operation items as a content of a corresponding one of the plurality of group lists, said module providing a hierarchical subdivision of the plurality of production based operation items and the non-production based operation items in the plurality of group lists to input the plurality of group lists into said processing unit in a standard form;

a production line including at least one manufacturing sub-system with a command interface configured to execute processes in accordance with the plurality of production based operation items; and a control unit connected to said command interface of said manufacturing sub-system;

wherein the plurality of non-production based operation items for each of the plurality of production based operation items includes at least a machine setup and a machine cleaning.

2. The system according to claim 1, wherein said module includes a program based interface for selectively actualizing the plurality of group lists, and the interface is connected to the at least one manufacturing sub-system to obtain the plurality of production based operation items.

3. The system according to claim 2, which further comprises an interactive monitoring device and a selecting device coupled to said interface for adding, deleting and activating all production and non-production operation items.

4. The system according to claim 1, wherein said processing unit includes a modeling device for performing a simulation of management of operation items used in manufacturing on the production line.

5. The system according to claim 1, wherein said processing unit includes a control device for checking at least one non-constant occurrence of management of operation items used in manufacturing on the production line.

6. The system according to claim 1, which further comprises a management unit for operation items used in manufacturing on the production line, said processing unit including a device for generating release software for said management unit.

7. The system according to claim 6, wherein the release software for the management of manufacturing operation items on the production line is configured to be embedded in main software for managing release software related to further production lines.

8. The system according to claim 1, wherein the plurality of non-production based operation items for each of the plurality of production based operation items includes a product quality check.

9. The system according to claim 1, wherein said module is configured to transmit a respective one of the plurality of group lists to said processing unit in the form of a list including the header and the at least one non-production based operation item.

* * * * *